(12) United States Patent
McLaughlin et al.

(10) Patent No.: US 6,501,779 B1
(45) Date of Patent: Dec. 31, 2002

(54) NETWORK COMMUNICATION SYSTEM

(75) Inventors: Thomas J. McLaughlin, Salt Lake City, UT (US); James E. Messinger, Sandy, UT (US); Ronald J. Nelson, Salt Lake City, UT (US); Alan S. Call, Salt Lake City, UT (US); Jeff F. Knighton, Salt Lake City, UT (US)

(73) Assignee: NXi Communications, Inc., Salt Lake City, UT (US)

( * ) Notice: Subject to any disclaimer, the term of this patent is extended or adjusted under 35 U.S.C. 154(b) by 0 days.

(21) Appl. No.: 09/579,569

(22) Filed: May 26, 2000

Related U.S. Application Data

(60) Provisional application No. 60/135,899, filed on May 26, 1999.

(51) Int. Cl.$^7$ .............................................. H04M 11/00
(52) U.S. Cl. ...................... 372/52; 379/90.01; 370/352
(58) Field of Search ............................... 379/52, 90.01, 379/93.01; 370/352, 356; 709/212, 219; 345/348, 352, 329

(56) References Cited

U.S. PATENT DOCUMENTS 5,873,077 A * 2/1999 Kanoh et al. .................. 707/3
6,002,749 A * 12/1999 Hansen et al. ................ 379/52
6,421,425 B1 * 7/2002 Bossi et al. ................... 379/52

* cited by examiner

Primary Examiner—Melur Ramakrishnaiah
(74) Attorney, Agent, or Firm—John R. Thompson; Stoel Rives LLP

(57) ABSTRACT

A communication system allows a remote user to access a web site across a PSTN using a conventional text device such as a TTY device. The web site is configured with text, menu options, and communication transfer capabilities as may be found in an automated telephone service. The system includes a text gateway module in electrical communication with the text device. The text gateway module receives text data generated by the text device and directs the text data to a text/web translator. The web/text translator converts the text data into web data suitable for use by a web site and server. The web/text translator transmits the web data to a web gateway module that directs the web data to a specified web site. The web/text translator further receives from the web gateway module web data generated by the web site. The web/text translator converts the web data to text data which is readable by the text device. The text data is then transmitted to the text gateway module and then passed to the text device. The web/text translator converts text, graphical icons, menu options, and communication links within a web site into equivalent forms of text data. A remote deaf user may read and select different options that previously were available only in a automated telephone service.

23 Claims, 2 Drawing Sheets

NETWORK COMMUNICATION SYSTEM

RELATED APPLICATIONS

This application claims priority to U.S. Patent Application No. 60/135,899, filed May 26, 1999 and is incorporated herein by reference.

BACKGROUND OF THE INVENTION

1. Field of the Invention

The invention relates to a communication systems along various computer networks and, more specifically, to wide area networks incorporating text communication methods.

2. Relevant Technology

The "plain old telephone system" (POTS) or "public switched telephone network" (PSTN) has been in development since the late 1800's. In general, the term PSTN refers to any medium of communication in which at least part of the link is analog, and not digital, in nature. The PSTN was first developed in the late 1800's to allow for person to person communications by voice over long distances. The invention of computers made it useful to exchange digital data over the PSTN. In the 1950's, "modems" were developed for that purpose. A modem accepts digital data and modulates it into a form suitable for transmission over the PSTN such that a corresponding receiving modem may demodulate the signal back into the original digital data.

Computer networks have become very popular in allowing computers to communicate and transmit data across local area networks (LAN) and wide area networks (WAN). The Internet itself could be considered to be a WAN. A LAN or WAN link is digital in nature and conforms to a known protocol such as NETBIOS, TCP/IP, SPX/IPX, etc. over a communication media such as Ethernet, Token Ring, or higher speed media. Several modem protocols of the format "V dot" protocol include the V.32, V.34, and V.70 protocol. All such "V dot" protocols are promulgated by the International Telecommunications Union (ITU), the governing body for modem standards based in Geneva Switzerland. The earlier "Bell" standards, such as Bell 103, Bell 212, etc., are similar but earlier modem standards adopted in the United States prior to the U.S.'s joining of the ITU. The full specifications of any ITU standard may be obtained from the ITU.

The well known "2500" series analog phones connect directly to the PSTN but not directly to a LAN or WAN. In the PSTN, often the link from a business or residence to the "CO" (central office) is analog, although much of the rest of the PSTN may be digital. Modems such as V.32, V.34, etc. are designed to operate on an analog or mixed analog/digital link. The term PSTN sometimes includes PBX or key phone systems or links as found in many organizations. Examples of such PBX or key systems include AT&T's "Merlin" -or "Partner Plus" systems, Nortel's SL1, SL100, or Northstar systems, and so on. PBX or key systems will often connect directly to analog lines from the PSTN, although digital connections, such as T1 lines, are common. A voice caller on a PBX or key system is able to call and converse with an analog 2500 series phone whereas such a phone will not connect directly to a LAN or WAN network.

Modems provide a means for the deaf or speech impaired to communicate over the telephone system, since typed characters can be sent over the PSTN via modem and read by another modem user. However, standard modems have evolved with poor provision for communications by the deaf or speech impaired and are largely unsuitable for this purpose. Standard modems were developed primarily for computer to computer communications. For example, most standard modems have a "carrier" which is a constant audible signal. If this signal is lost because the call is placed on hold, a standard modem will generally hang up and cannot reestablish the connection with a different modem. Modems are very inflexible in their protocol requirements and will not operate properly or will abort the call if the protocol settings are wrong.

Automated telephone systems are widely used in telephonic communications to provide automated information and various services to hearing callers. The automated telephone systems are sometimes referred to as "IVR," for "Interactive Voice Response" systems, or "VRU" for "Voice Response Unit", and are well known in the telephone industry. By way of example, when a hearing caller calls the phone number of an entity, such as a business or government organization, the caller may receive information services, transfer services to desired entities, messaging services, fax-on-demand services, and other services through the use of an automated telephone system.

With the automated telephone service, the hearing caller may be instructed by voice prompts to select and enter different command options. For example, the caller may be prompted to press 1 for sales, 2 for office hours, or to enter the extension of a party that the caller wishes to contact, and so on. Another service provided by an automated telephone system is to provide recordings of job openings. The hearing caller may be able to activate a voice description of available job openings by pressing the keys on their phone. Pressing a key on a touch tone phone creates DTMF tones which are detected by the automated telephone system.

A long standing challenge is to make systems accessible to the text devices, such as the Baudot TTY devices, used by the deaf. Since a conventional voice telephone is not usable by a deaf person, the deaf commonly use a device called a TTY or TDD device. The TTY device has a keyboard and display and is used in place of a voice telephone by deaf persons. Typically the display on a TTY displays one or two lines of text, and these displays typically do not accommodate graphics.

Manufacturers of automated telephone systems have been under pressure for many years to make their systems accessible to the deaf using TTY technology. One solution used in the industry is to treat TTY as a foreign language. That is, TTY tones are recorded and played back to the TTY caller. The deaf caller is then expected to create DTMF tones to navigate the menus displayed on the TTY screen. A problem with this approach is that many TTY devices cannot create DTMF tones after the call is dialed.

Internet technology and associated web sites would appear to provide some answers to the problems faced by the deaf. However, two points should be made here regarding this application. First, many of the deaf do not have computers or Internet access, so information or services offered on a web site are not accessible to such persons. Secondly, many services offered to hearing callers through automated telephone systems are not offered on an organization's web site. For example, an automated telephone system often supports transfer and messaging services to allow a hearing caller to call a person or department within the organization or leave a message for a person or department. Frequently an organization's web site is not designed to provide such a service. A web site may provide a general e-mail address for contact information, and even this is not available to a deaf person without Internet access. Other services may also be placed on the automated telephone system but not the web site, such as a job posting service.

It would seem equitable that if services are offered hearing callers using a conventional phone, then equivalent services should be offered a deaf person using a TTY device or other text device. In fact, federal law since the Americans with Disabilities Act of 1990, has contained language urging this type of equivalency. In large part these laws have not been heeded or enforced due to the difficulty, expense, and complexity of the available solutions.

A possible approach to providing information and other services to TTY callers would be to construct a parallel and equivalent system accessible to TTY callers. Information, such as job listings, made available in certain formats must be made available to TTY callers by constructing a parallel and complete system just for TTY callers. An objection to this method is that often the number of TTY callers is quite low. Maintaining a separate and parallel information system just for TTY callers is expensive and hard to justify for the low volume of TTY calls received.

Federal law does not require that web sites on the Internet provide access to TTY users. It is reasonable to equate a voice telephone used by a hearing person with a TTY device used by a deaf person. Therefore, services offered to a voice telephone caller should also be available to a TTY caller. However, web site content is not available to a voice telephone user so it is not reasonable or expected for such content to be available to a TTY caller. Indeed there are no laws or regulations to create this type of access for the deaf.

It would therefore be an advancement in the art to provide a system accessible by the deaf and providing equivalent information and services as that found in an automated telephone service. It would be a further advancement in the art to provide such a system that is accessible across a PSTN using conventional text devices such as TTY devices. It would be yet another advancement in the art to provide such a system with wide scale accessability. Such an invention is disclosed and claimed herein.

SUMMARY OF THE INVENTION

The present invention relates to a network communication system configured to operate over a network such as a PSTN or the Internet. The system allows a remote user to access a web site hosted by a server in communication with the PSTN. The web site may be configured with text, menu options, communication transfer services, and message storage services as may be found in an automated telephone service. The remote user may access the web site using a conventional text device, such as a TTY device, or a conventional browser.

The system includes a text gateway module in electrical communication with the text device, such as a TTY device. The text gateway module receives text data generated by the text device and directs the text data to a text/web translator. The web/text translator converts the text data into web data suitable for use by a web site and server. The web/text translator transmits the web data to a web gateway module that directs the web data to a specified web site. The web/text translator receives web data generated by the web site from the web gateway module. The web/text translator converts the web data to text data which is readable by the text device. The text data is then transmitted to the text gateway module and then passed to the text device.

The text gateway module, web/text translator, and the web gateway module may be combined as a single module or may be separately identifiable. The modules may further be resident at the server or dispersed at various locations in the communication chain from the text device to the server.

The web/text translator converts text, graphic icons, menu options, and communication links within a web site into equivalent forms of text data. A remote deaf user may read and select different options that previously were available only in an automated telephone service. A remote deaf user may access web sites across a PSTN and use the services of an automated system that were previously unavailable.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

A preferred embodiment of the invention is now described with reference to the Figures, where like reference numbers indicate identical or functionally similar elements. The components of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Various components of the invention are described herein as "modules." In one embodiment, the modules may be implemented as software, hardware, firmware, or any combination thereof. For example, as used herein, a module may include any type of computer instruction or computer executable code located within a memory device and/or transmitted as electronic signals over a system bus or network. An identified module may, for instance, comprise one or more physical or logical blocks of computer instructions, which may be organized as an object, procedure, function, or the like.

Nevertheless, the identified modules need not be located together, but may comprise disparate instructions stored in different locations, which together implement the described functionality of the module. Indeed, a module may comprise a single instruction, or many instructions, and may even be distributed over several different code segments, among different programs, and across several memory devices.

Figure 1:
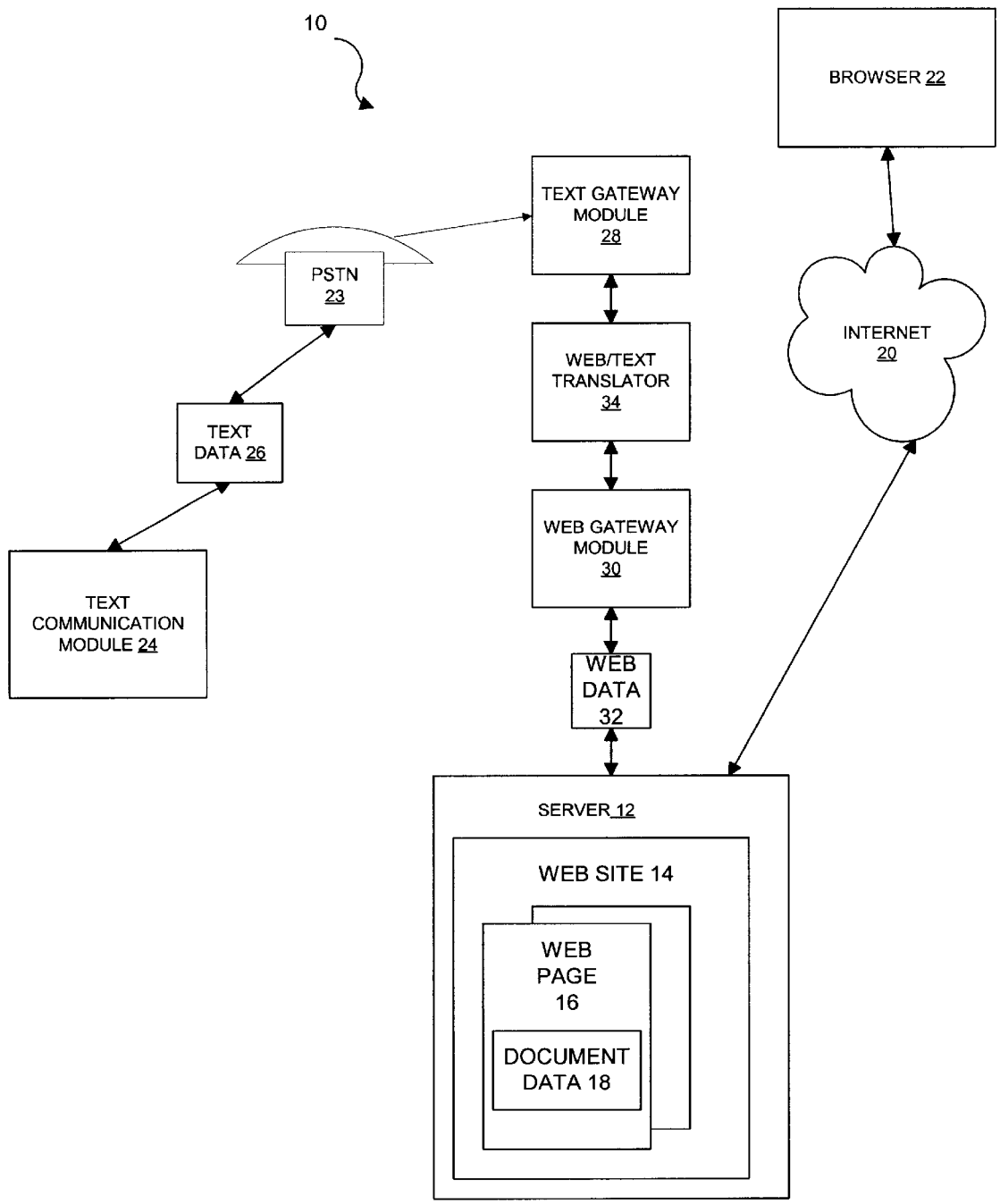
FIG. 1 is a block diagram of a software environment for a network communication system of the present invention.

Referring to FIG. 1, a block diagram of one embodiment of a network communication system 10 of the present invention is shown. The system 10 is configured to allow communication between web sites and text communication devices, such as Baudot TTY devices. The system 10 may include a server 12 hosting a web site 14 containing one or more web pages 16. Each web page 16 may contain document data 18. The document data 18 is embodied in a language readable by the server 12 such as HTML, XML, WML, a derivation thereof, or other suitable language.

The document data 18 may include text, graphic images, links, and other features. The document data 18 may represent content which are available through an automated telephone system such as used by hearing callers. The document data 18 may further include executable programs which provide services offered through an automated telephone system. Such services may include text listings of automated recordings and transfer and messaging services which may not be typically found on web sites.

The server 12 is in communication with a global network such as the Internet 20. A conventional web browser 22 may further be in communication with the Internet 20 to access the server 12 and display document data 18 on the web site 14.

The server 12 may also be in communication with a telephone network such as a conventional PSTN 23. A remote user may use a text communication module 24 to access the web site 14 through the PSTN 23. The text communication module 24 may be embodied as hardware and/or software modules which are typically resident on TTY devices and modems. As referenced herein, a text communication module 24 is configured for compatibility with a PSTN 23 to thereby provide communication across a PSTN.

The text communication module 24 generates text data 26 in response to a remote user's commands. The text data 26 is computer readable and is transmitted across the PSTN 23 to the server 12. The text communication module 24 further receives text data 26 and displays the text data 26 for a remote user.

The system 10 further includes a text gateway module 28 which is disposed between the text communication module 24 and the server 12. The text gateway module 28 may reside at the site of the remote user such as within a TTY device, at the site of the server 12, or at any location along the communication line. The text gateway module 28 is configured to interface with the text communication module 24 or the PSTN 23 and receive text data 26. The text gateway module 28 then directs the text data 24 to the appropriate recipient.

The system 10 further includes a web gateway module 30 that is disposed between the text gateway module 26 and the server 12. The web gateway module 30 is configured to receive and pass web data 32 that is readable by the server 12. The web data 32 may include conventional languages such as Hyper Text Markup Language (HTML) or any of its derivations such as XML and WML. WML is a subset of XML but WML has certain enhancements or extensions on top of XML. WML is used for Wireless Application Protocol (WAP) devices. WAP is a well known specification within the wireless industry.

Devices supporting WML and WAP usually have relatively small display screens with comparatively low resolution and cannot generally display complex graphics or large amounts of text. For this reason, WAP servers typically provide simple text menus or simple textual information to WAP devices. XML or HTML servers, on the other hand, which interact with conventional browsers typically provide much more complex graphics and text as compared to WML servers. However, typical web sites supporting HTML/XML can provide a text-only or simpler version to remote users, and a simplified conventional web site can prove suitable for the techniques discussed herein.

A text-only version of a web site 14 is desirable for the blind or low vision remote user who is viewing the web site 14 with the aid of a conventional screen reader. A screen reader uses text to voice technology to read the text on a web site 14 and speak the text as voice sounds. A screen reader typically does not accommodate graphic images very well so some web sites 14 offer a text-only version of the web site 14. A text-only version of a web site 14 will also, in general, work better with the techniques described herein since graphic images cannot be fully converted to text data 26. Therefore, there are other reasons besides access by deaf remote users to maintain a text-only or simplified version of a web site 14. Once a text-only version of a web site 14 is established then the techniques described here can be used with good effect.

The system 10 further includes a web/text translator 34 that is disposed between the text gateway module 26 and the web gateway module 30. The web/text translator 34 is configured to receive web data 32 from the server 12 and translate the web data 32 into text data 26 that is readable by the text communication module 24. The web data 32 may be reflection of the document data 18 on the web site 14. Although not all web data 32 has a direct correspondence to text data 26, the web/text translator 34 is configured to generate equivalent forms of information. The web/text translator 34 further receives text data 26 and translates the text data 26 into web data 32 that is readable by the server 12. Thus configured, the web/text translator 34 interacts with the web site 14 as if it were a conventional browser. Thus, web/text translator 34 may communicate with conventional web sites 14 and the web site 14 may be written in a conventional manner.

The text gateway module 28, the web gateway module 30, and the web/text translator 34 may be combined into a single module or may be combined into one module. The modules 28, 30, 34 may further be resident at various locations between the text communication module 24 and the server 12. The functions of the modules 28, 30, 34 are present in that there is gateway 30 to link to the web site 14, another gateway 28 to link to the text communication module 24, and a translator 34 between the incompatible formats supported by the text communication module 24 and the web site 14.

Figure 2:
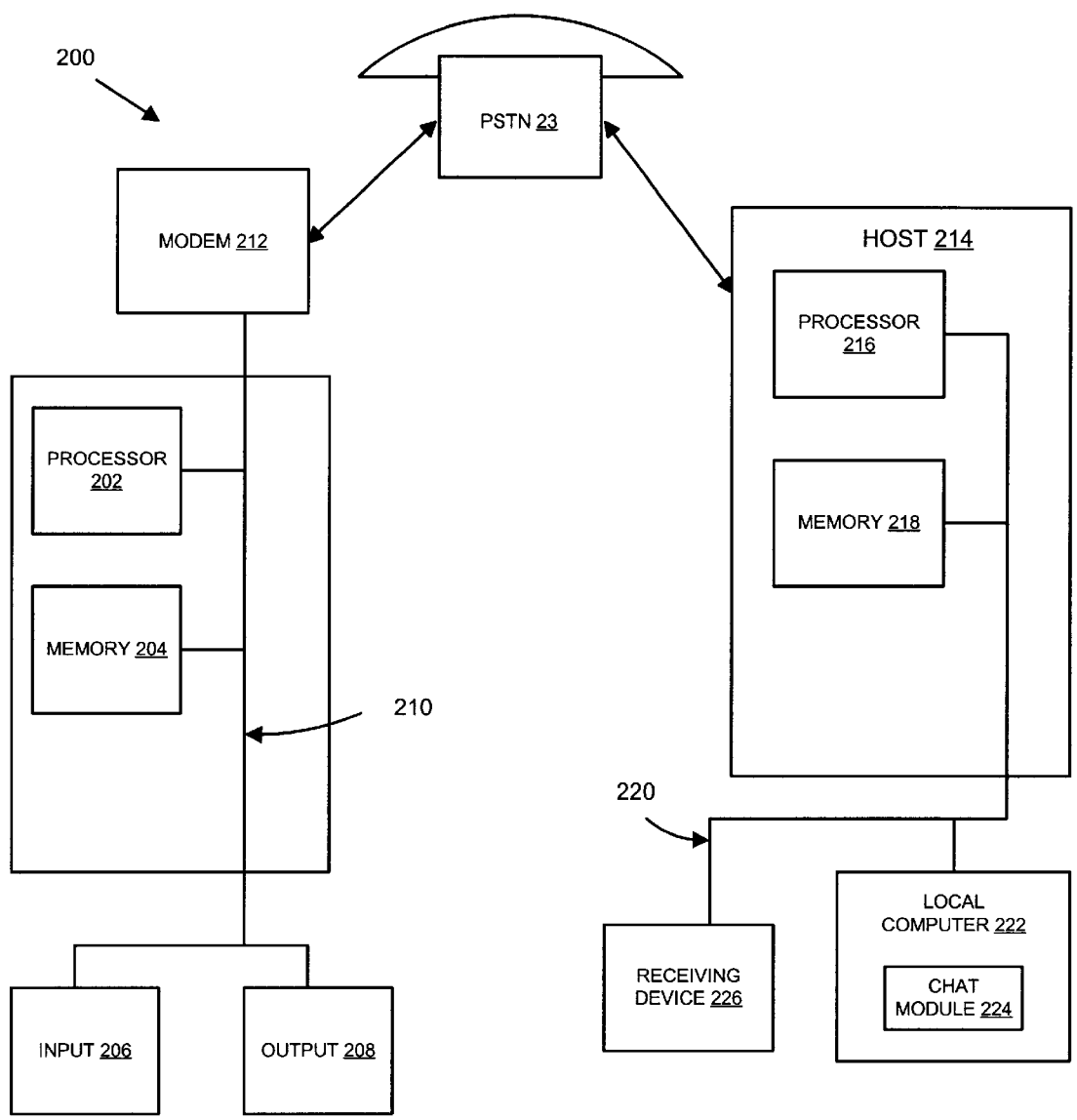
FIG. 2 is a block diagram of a hardware environment for a network communication system of the present invention.

Referring to FIG. 2, a block diagram illustrating hardware components of the communication system 10 is shown. The system 10 may include a text device 200 for communicating with the web site 14. The text device 200 is a device compatible for communication and interfacing with a PSTN 19. However, the text device 200 may not necessarily be compatible for communication across the Internet 20. Thus, a text device 200 may include a TTY device which is designed for PSTN communication. A text device 200 may also include a personal computer with a modem for communicating across the PSTN 23. One of skill in the art will appreciate that a text device 200 may be embodied in various ways and are included within the scope of the invention.

The text device 200 may include a processor 202 in electrical communication with a memory device 204. The memory device 204 may include one or more devices such as a hard drive or non-volatile storage device, a read-only memory (ROM), and a random access (and usually volatile)

memory (RAM). The text device 200 may include an input device 206 for receiving inputs from a remote user or another device. Similarly, an output device 208 may be provided for displaying to a remote user.

Internal to the text device 200, a bus 210 places the processor 202, the memory device 204, input device 206, and output device 208 in electrical communication with one another. The bus 210 may be thought of as a data carrier. As such, the bus 210 may be embodied in numerous configurations. Wire, fiber optic line, wireless electromagnetic communications by visible light, infrared, and radio frequencies may likewise be implemented as appropriate for the bus 210.

The input device 206 may include one or more physical embodiments. For example, a keyboard may be used for interaction with the user, as may a mouse or stylus pad. A touch screen, a telephone, or simply a telephone line, may be used for communication with other devices, users, or the like.

The output device 208 may likewise include one or more physical hardware units. A monitor may provide outputs to a user for feedback during a process, or for assisting two-way communication between the processor 202 and a user. A printer or a hard drive may be used for outputting information as an output device 208.

The text device 200 may further include a modem 212, such as a conventional modem, for communication via the PSTN 23. The modem 212 may be embodied as an ITU/TDD modem which is defined herein as a modem compatible with standard modems and one or more of the 'text telephone' standards used by the deaf. Examples of such text telephones standards are the 45/50 bps Baudot TTY's used by the deaf in the U.S., Canada, Australia, etc. or the EDT (European Deaf Telephones) used in certain countries. The modem 212 may also be embodied as an ITU/TDD/VOICE modem which allows transmission and reception of ITU, TDD, and voice signals over a telephone line to and from a remote device. The modem 212 could also include ITU (or other standard modem) capabilities without detecting, recording, or transmitting TDD or voice signals. The modem 212 could further be embodied with ITU/VOICE capabilities which do not detect, record, or transmit TDD signals.

In one embodiment, the modem 212 is embodied as an ITU/TDD/VOICE modem with features described above. In one commercial embodiment, the modem 212 may feature 33,600 bps for standard modem connections, fax at 14,400 bps, 45/50 bps Baudot TTY, voice record and voice playback, digital simultaneous voice and data (DSVD), as in the V.70 standard. Further advances in modem technology data transmissions may also be incorporated into the ITU/TDD/VOICE modem 212 and are within the scope of the invention. One of skill in the art will appreciate that the modem 212 may be embodied as various devices and are included within the scope of the invention. The term modem 212 should therefore be interpreted broadly to include various devices for communicating across a telephone network such as the PSTN 23.

In one embodiment, the text device 200 and the modem 212 may be a TTY device. As such, the input device 206 is embodied as a keypad and the output device 208 is embodied as a display monitor for illustrating alphanumeric characters representing received text data 24. The text device 200 includes the text communication module 24 which may be resident in the memory 204 to effect operation of the processor 202 and the modem 212. In an alternative embodiment, the text device 200 may be embodied as a conventional personal computer having the text communication module 24 resident in the memory 204 and a modem 212 embodied as previously described.

The system 10 further includes a host 214 which may be embodied as a computer having a processor 216 in communication with a memory 218. The server 12 and web site 14 may reside in the memory 218 of the host 214. The host 214 is in communication with the PSTN 23 to provide access to the web site 14. The text gateway module 28, web gateway module 30, and the web/text translator 34 may be resident in whole or in part in the memory 218. Alternatively, the modules 28, 30, 34 may reside in the memory 204 or be dispersed throughout the communication line between the text device 200 and the host 214.

The system 10 allows communication between a text device 200 and a web site 14 across the PSTN 23. As such, a browser 22 is not require, but the modules 28, 30, 34 perform equivalent functions to enable communication. The text device 200 may be embodied as a far less sophisticated device such as a conventional TYY device. This allows for deaf callers to communicate with a web site 14 using conventional technology at the remote site. Deaf callers are able to review information and select options that previously may have only been available on automated telephone systems.

A substantial amount of the web data 32 may be text oriented and is easily translated by the web/text translator 34 into text data 26. Text data 26 may be readily displayed on even the most simple text devices 200. Some forms of web data 32, however, require some additional manipulation by the web/text translator 34 in order to accommodate the text device 200. Frequently, the text device 200 may be embodied as a device that does support a mouse as an input device 206. The text device 200 may also not support graphics on the output device 208 and therefore not function as a graphical user interface. A web site 14, on the other hand, often includes graphical icons such as buttons or links which are selected by a mouse to navigate the web site 14. Obviously, graphic images do not always convert well into text data 26.

One solution is to maintain a web site 14 which is text-only or simplified to reduce the number of graphic images as previously discussed. A simplified web site 14, such as a WML web site 14, is particularly attractive for the scenario described here because it is designed to have simple text. WAP devices receiving WML typically have small low resolution displays, so the document data 18 is already formatted as simple text. The amount of translation from WML to a text device 200 may be less than that needed from a complex XML page. However, even standard web sites supporting HTML/XML or its variants can be used, or can exist in a simplified text-only version and be quite suitable for the techniques discussed herein.

When graphic images are embodied in the web data 32 they may be converted by the web/text translator 34 into text data 26. The text data 26 may include descriptions of the graphic images. In this manner, the system 10 may provide at least equivalent services to those provided by an automated telephone system.

Graphical icons that provide options are converted by the web/text translator 34 into text menus for the text device 200. A web page 18 may include general text and graphic icons for options. For example, the graphic icons may be listed as Sales, Tech Support, Customer Service, and Contact Us to provide various links. The web/text translator 34 reformats the general text into text data 26 and sends it to the text device 200. If there are long text blocks, then the web/text translator 34 may segment the text block into different segments of text data 26. The web/text translator may then insert command options between the blocks of text data 26. The command options may interrupt transmission of the text data 26 and allow a remote user an option effecting viewing of the text data 26. Command options may allow a remote user to continue viewing text data 26, skip a block of text data 26, proceed to a menu, or enter a new web site. In one embodiment, the options may be presented as: "Type C to continue, S to skip to the next paragraph, M to skip to the choice menu, or U to enter a new web site." The web/text translator 34 may receive links represented in the web data 32 which allow a remote user to link to another web site 14, web page 16, or communicate with a person. The web/text translator 34 may convert the links into transfer command options which are readable by the text device 200. The transfer command options may be assembled in a text menu. By way of example, the text menu may read: "MenuType: SALES, TECH SUPPORT,CUSTOMER SERVICE, or CONTACT US."

The user may select a desired option from the menu by entering a response reflecting the menu option. The text device 200 then transmits a transfer command to the web/text translator 34. The web/text translator 34 analyzes the transfer command and provides the correct action for that choice. If the transfer command is a link to another web page 16, then the web/text translator 34 points the web gateway module 30 to the URL of that web page 18. Web data 32 reflecting the document data 18 of the new web page 16 is then received by the web/text translator 34.

A web site 14 may also contain an option for e-mail correspondence. For example, the option "Contact Us" may initiate generation of an e-mail. With a conventional browser, the web site 14 may create a text box having a subject box, e-mail address, and a message box. The web/text translator 34 may be configured to create equivalent actions for the remote user. The web/text translator 34 may be configured to prompt the remote user for a subject and message using text based prompts. In place of the e-mail address, the web/text translator 34 may ask the remote user to provide a phone number. The web/text translator 34 may then generate and fill in the text boxes for subject, message, and e-mail address. Web data 32 reflecting this information is then sent to the server 12.

A feature of the system 10 of the present invention is to provide transfer and messaging services for remote users of the web site 14. Automated telephone systems, and IVR systems in particular, often allow a hearing caller to enter an extension number on the phone keypad and transfer to an individual's phone or a department's phones. If the call is not answered, then typically a voice message may be entered in a voice mail system. However, an organization's web site does not typically provide transfer and messaging services to individuals or departments in this manner.

The web site 14 may include document data 18 having links to transfer services to individuals and departments. As discussed previously, the link may be a graphical icon which is converted by the web/text translator 34 to a text menu option. The web site 14 may be configured with control codes or other markers for transfer service to support this function. A remote user of the text device 200 may select such an option and send a transfer command to the web/text translator 34. The web/text translator 34 converts the text data 26 and notes the transfer to an individual or department. If the selected option is to communicate with a live individual, such as a department, then the web/text translator 34 creates a call transfer to that department or individual. This may occur if the remote user selects the option TECH SUPPORT from the menu indicating a desire for live communication to address technical issues.

The host 214 may be in electrical communication with a network 220, such as a local area network, having one or more local computers 222. The local computers 222 may be embodied as personal computers having resident thereon a chat module 224. The chat module 224 may be configured to indicate through an audio or visual signal that text communication with a remote user is requested. The local user may confirm initiation of the communication and a live chat session may begin. The chat module 224 may be configured to receive and display text data 26 from the remote user. The chat module 224 may further generate text data 26 in response to the local user's inputs.

The text data 26 transmitted by the text device 200 may be sent through the text gateway module 28, the web/text translator 34, the web gateway 30, the network 220, and to the local computer 222. Similarly, text data 26 generated by the local computer 222 may be sent in the reverse direction to the remote user. The text data 26 generated by the local computer 222 may be in a format readable by the text device 200. Therefore, the text data 26 may be transmitted to the text device 200 without conversion by the web/text translator 34. The web/text translator 34 may be configured to identify text data 26 and pass it without conversion.

If a local user declines initiation of a communication session, then the chat module 224 may be configured to generate and transmit such an indication to the text device 200. The web/text translator 34 may generate a prompt to take a message for the local user. The remote user may respond with text data 26 representing a message. The text data 26 may then be forwarded in a variety of methods. In one embodiment, the web/text translator 34 may forward the text data 26 to an e-mail account of the local user or department called. Forwarding of the text data 26 to an e-mail account may be achieved through a local mailbox system on the network 220.

The web/text translator 34 may also forward the text data 34 to a receiving device 226 in electrical communication with the network 220. The receiving device 226 may be embodied as a fax machine, alpha pager, or other receiving device of the local user or department. The receiving device 226 may be compatible with the received text data 26. Alternatively, the web/text translator 34 may be configured to convert the text data 26 into a format compatible with the receiving device 226.

In one embodiment, the system 10 may support voice communication between a local user and a remote user. The text device 200 may be configured with an audio device to receive voice sounds from a remote user. The text device 200 may send the voice sounds to the local computer 222 or receiving device 226 where the voice sounds are played on an audio device in electrical communication with the local computer 222 or receiving device. The capability to transmit voice sounds from a remote user to a local user is useful for deaf individuals who prefer to speak but wish to receive text back. The system 10 may also be configured to accept a voice message from the remote user. If the local user declines initiation of a live chat session, the web/text translator 34 may be configured to receive voice sounds from the remote user. The voice sounds may then be injected or stored into a conventional voice mail system corresponding to the local user or department.

With the system 10 of the present invention it is possible to provide services similar to those of an automated telephone system to deaf remote users. A service entity may also be supported by the present invention to provide services to deaf remote users which were previously unavailable. For example, a service entity may rent a phone number to the ABC Company. In other words, the phone number rings to the service entity, but the number is advertised as belonging to the ABC Company. If a remote user dials the phone number through the text device 200, then the remote user is linked to the host 214. At this point, the host 214 may obtain and record the number dialed (DID or DNIS) by the calling party and access a database in electrical communication with the host 214. From the database, the host 214 may confirm that the phone number belongs to the ABC Company. The host 214 may then find the web site 14 of the ABC Company server 12 which maps to the phone number.

The host 214 may then link to the server 12 through the web gateway module 30 and link the web site 14 to the remote caller. The web/text translator 34 may then translate the web data 32 provided on the web site 14 as described above. The ABC Company may maintain information and services on its web site 14, and the service entity may provide remote user access to this information and services. An advantage of this approach is that as a client of the service entity, the ABC Company does not need to maintain a TTY modem or provide parallel services just for TTY callers. It is also possible for a service entity to provide a general phone number and allow remote users to enter the URL address of the web site 14 desired.

As one of skill in the art will appreciate, a single web site 14 may service remote users using various devices for access. Thus, remote users may use text devices 200, conventional browsers 22, a conventional browser 22 with a screen reader, or a WAP device. A web site 14 may further be configured with text-only web pages 16 for improved access by specific devices, such as a TTY device. A single web site 14 may therefore provide for several audiences in one text-only or suitably designed web site 14.

Alternatively a web site 14 may have web pages 16 that reflect much of the same content and services but are optimized for WAP devices, vision impaired users, and remote text users. Much of the same content and services of a primary web site 14 may be ported to the text-only web site 14 since the same tools are used to create each. Also, a web designer will be already comfortable with the web tools used to create the text-only web sites 16.

The present invention allows for users of text devices 200 to access web sites 14 over a PSTN 23 without accessing the Internet 20. Thus, a remote user does not need a browser 22 or other equipment normally required for Internet access. The remote user may therefore use conventional text devices 200 and expand their use to web sites 14. The web sites 14 may be configured to provide information and services equivalent to those on an automated telephone service.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A communication system to enable a remote user using a TTY text device to communicate across a PSTN with a web site hosted on a server, comprising:

a text gateway module in electrical communication with the TTY and configured to receive and convey text data generated by the TTY;

a web gateway module in electrical communication with the server and configured to receive and convey web data; and a web/text translator in electrical communication with the text gateway module and the web gateway module and configured to convert text data into a web data suitable for communication with a web site on the server and further configured to convert web data into a text data suitable for communication with the TTY, and separate blocks of text data and insert command options between the blocks, the command options providing control of the viewing of the blocks of text data.

2. The communication system of claim 1 wherein the web/text translator is further configured to convert graphical icons represented by web data to text menus represented by text data.

3. The communication system of claim 1 wherein the web/text translator is further configured to convert a link represented by web data to a transfer command option represented by text data.

4. The communication system of claim 3 further comprising a chat module in electrical communication with the web/text translator and configured to provide dual communication between a remote user and a local user, wherein the web/text translator is further configured that upon receipt of a transfer command, the web/text translator directs communication from the remote user to the chat module.

5. The communication system of claim 4, wherein the chat module is further configured to prompt a local user for initiation of a communication session.

6. The communication system of claim 4, wherein the chat module is further configured to provide voice communication from the remote user and text data from the local user.

7. The communication system of claim 4, wherein the web/text translator is further configured to direct communication from the remote user to a message storage if the chat module is non-responsive.

8. A method for a remote user using a TTY text device to communicate across a PSTN with a web site hosted on a server, the method comprising:

receiving text data generated by the TTY and directed to the web site;

converting the text data into web data suitable for communication with the web site;

directing the web data to the web site;

receiving web data generated by the web site;

converting the web data into text data suitable for communication with the TTY;

separating text data into blocks;

generating command options that control viewing of the blocks;

inserting the command options between the blocks; and directing the text data to the text device.

9. The method of claim 8 further comprising, receiving graphical icons represented by web data;

converting the graphical icons to text menus represented by text data; and directing the text menus to the text device.

10. The method of claim 8 further comprising, receiving a link represented by web data;

converting the link to a transfer command option represented by text data; and directing the transfer command option to the text device.

11. The method of claim 10 further comprising, receiving a transfer command from the text device;

directing communication from the text device to a local user reflected in the transfer command; and enabling a two way communication session between the remote user and the local user.

12. The method of claim 11 further comprising prompting a local user for confirmation to initiate a two way communication session.

13. The method of claim 11 further comprising providing voice communication from the remote user and text data communication from the local user.

14. The method of claim 11 further comprising directing communication from the remote user to a message storage if the local user is non-responsive.

15. The method of claim 8 further comprising, receiving a phone number across the PSTN from a remote user;

identifying the phone number dialed;

linking the phone number to the web site; and placing the remote user in communication with the web site.

16. A computer readable medium containing instructions for a method to enable a remote user using a TTY text device to communicate across a PSTN with a web site hosted on a server, the method comprising:

receiving text data generated by the TTY and directed to the web site;

converting the text data into web data suitable for communication with the web site;

directing the web data to the web site;

receiving web data generated by the web site;

converting the web data into text data suitable for communication with TTY;

separating text data into blocks;

generating command options that control viewing of the blocks;

inserting the command options between the blocks; and directing the text data to the TTY.

17. The computer readable medium of claim 16 wherein the method further comprises, receiving graphical icons represented by web data;

converting the graphical icons to text menus represented by text data; and directing the text menus to the text device.

18. The computer readable medium of claim 16 wherein the method further comprises, receiving a link represented by web data;

converting the link to a transfer command option represented by text data; and directing the transfer command option to the text device.

19. The computer readable medium of claim 18 wherein the method further comprises, receiving a transfer command from the text device;

directing communication from the text device to a local user reflected in the transfer command; and enabling a two way communication session between the remote user and the local user.

20. The computer readable medium of claim 19 wherein the method further comprises prompting a local user for confirmation to initiate a two way communication session.

21. The computer readable medium of claim 19 wherein the method further comprises providing voice communication from the remote user and text data communication from the local user.

22. The computer readable medium of claim 19 wherein the method further comprises directing communication from the remote user to a message storage if the local user is non-responsive.

23. The computer readable medium of claim 16 wherein the method further comprises, receiving a phone number across the PSTN from a remote user;

identifying the phone number dialed;

linking the phone number to the web site; and placing the remote user in communication with the web site.

* * * * *